Feb. 16, 1937. H. L. BLUM 2,070,880
MULTIPLE METER
Filed Nov. 3, 1934
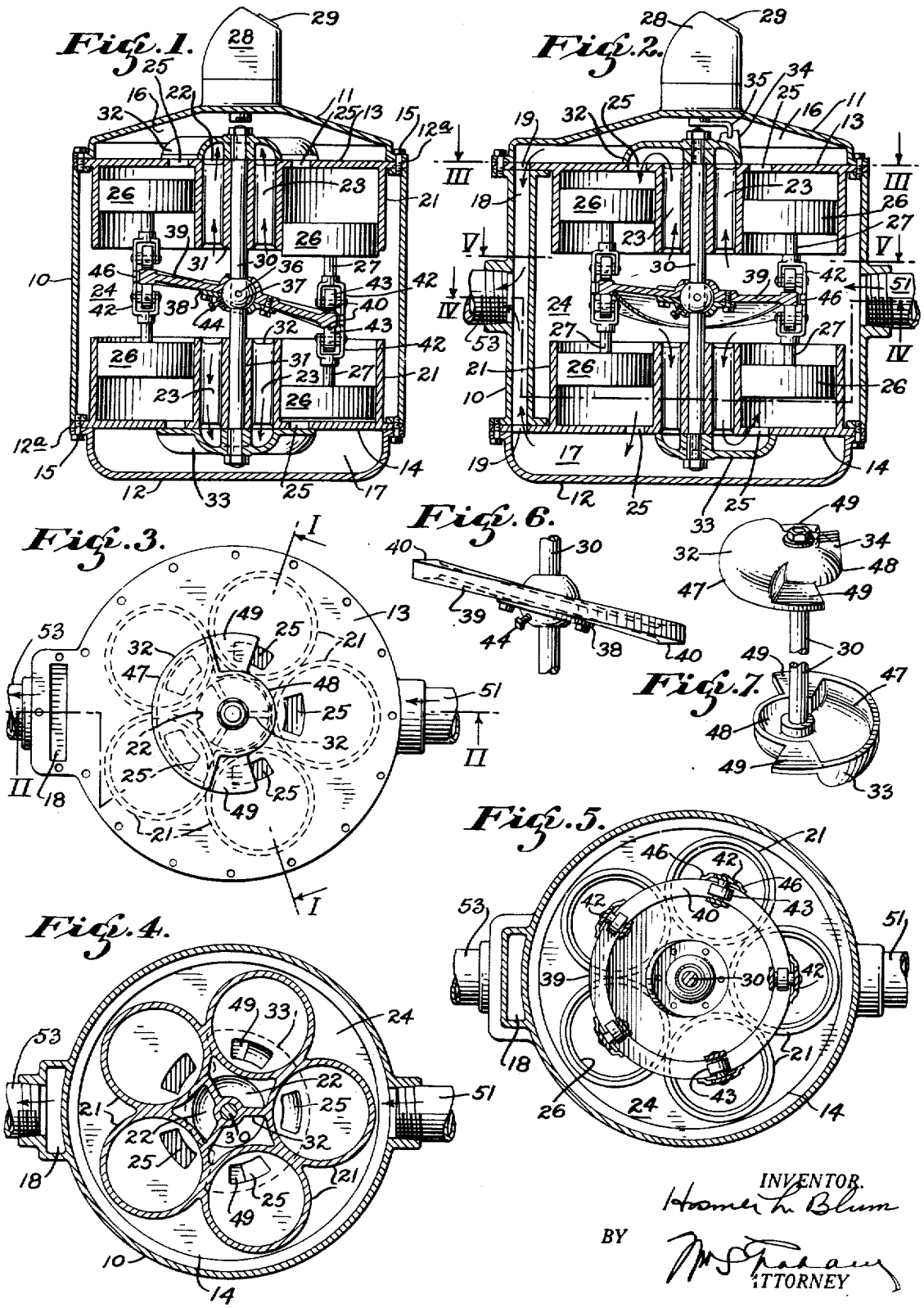
INVENTOR.
Homer L. Blum
BY
ATTORNEY Patented Feb. 16, 1937

2,070,880

UNITED STATES PATENT OFFICE 2,070,880

MULTIPLE METER

Hosmer L. Blum, Burlingame, Calif.

Application November 3, 1934, Serial No. 751,383

9 Claims. (Cl. 73—244)

This invention relates to multiple meters and particularly to multiple meters in which a plurality of banks of cylinders are arranged in opposed relation with a mechanism for operating valves interposed between the opposed banks of cylinders, and in which the opposed bank of cylinders each consists of a plurality of cylinders disposed about a common axis. Novel means are included for operating valves for controlling the flow into and out of the cylinders, and it is not intended to limit such novel means to meters having opposed banks of cylinders since such novel means may be equally employed with advantages in meters having a single bank of cylinders.

Among the objects of the invention are to provide a fluid meter of simple construction and greatly increased measuring capacity; to provide a fluid meter having a double bank of opposed cylinders including pistons therein and having novel means for actuating valve mechanism; to provide a meter having opposed pistons in opposed cylinders and means interposed therebetween for controlling flow through the meter; to provide, in a meter, a novel valve means and novel means for operating valve mechanism; to provide a meter which may be readily and easily assembled and disassembled; and to generally improve known meters of this type.

With the foregoing and other objects in view, all of which will be more apparent as this description proceeds, the invention consists in the novel construction and combination of parts hereinafter described, illustrated in the accompanying drawing, and pointed out in the claims hereto appended, it being understood that various changes in the form, proportion, size and details of construction of the apparatus may be resorted to within the scope of the appended claims, without departing from the spirit or sacrificing any of the advantages of the invention.

The attached drawing exemplifies one form which the invention may take, and reference is hereby directed thereto as a part of this specification:

Fig. 1 is a vertical sectional view on line I—I of Fig. 3.

Fig. 2 is a vertical sectional view on line II—II of Fig. 3.

Fig. 3 is a plan view on line III—III of Fig. 2, the top of the meter casing being removed.

Fig. 4 is a horizontal transverse sectional view on line IV—IV of Fig. 2.

Fig. 5 is a horizontal sectional view on line V—V of Fig. 2.

Fig. 6 is a fragmentary side elevation of a cam track member and its supporting shaft.

Fig. 7 is a perspective of valve mechanism enlarged to show detail of structure.

Referring to the drawing in which like characters of reference indicate corresponding parts, 10 indicates generally a casing preferably comprising a cylindrical tubular body having a top 11 and a bottom 12 sealed tightly thereto as by joints 12ª fastened securely by bolts 15. Transversely of the casing and adjacent the top 11 and bottom 12 are partition walls 13 and 14. Between the partition wall 13 and top 11 a chamber 16 is provided and between the partition wall 14 and the bottom 12 another chamber 17 is provided, said chambers 16 and 17 being in communication with an outlet chamber 18 through openings 19. Mounted upon each partition wall is a bank of a plurality of cylinders 21 which are concentrically arranged about a common axis, five of such cylinders being preferred in each bank so as to eliminate a dead-center balance in the operation of the meter. Each partition wall 13, 14 is provided centrally with an opening 22 which communicates through a passageway 23 with a central compartment 24 which is formed in the interior of the casing between the two partition walls 13, 14, and within which central compartment the cylinder bodies are housed.

Each of the partition walls 13 and 14 is also provided with an opening or port 25 into each cylinder mounted on that respective partition wall. Within each cylinder is a piston 26 which is reciprocable therein, each piston having a connecting rod 27. The two banks of cylinders are relatively spaced in the compartment 24 and the cylinders in each bank are preferably axially aligned with the cylinders in the opposing bank. The connecting rods 27 of the pistons 26 in opposed cylinders are operatively connected so that the pistons in opposed cylinders simultaneously move in the same direction but move in opposite directions in their relative functions with relation to the cylinder in which they reciprocate, that is, when opposed and operatively connected pistons are moving in the same direction relative to each other, one of them is making a discharge stroke in a cylinder while the other is making an intake stroke in the opposed cylinder. Extending axially through the two banks of cylinders and through the spaces 23 therebetween in the compartment 24 is a rotatable shaft 30 which is supported for rotation in tubular bearings 31 which are mounted on each partition wall and are supported thereon by webs 32 and extend longitudinally of the respective passageways 23. This rotatable shaft extends beyond the opposite sides of the two partition walls 13 and 14 and on each of said opposite sides within the respective chambers 16 and 17 said shaft mounts a rotatable valve 32, 33. The valve 32 most nearly adjacent the counting mechanism 28 is provided with an external wing 34 which engages an arm 35 which, upon revolution, is operative to register upon counting mechanism 28 which is provided with the usual sight face 29.

The rotation of shaft 30 is accomplished by the reciprocation of the pistons 26 through an operative connection between the connecting rods 27 and the shaft 30, whereby reciprocal motion of the pistons is translated to rotary motion of the shaft. It is to be understood that I do not limit myself to the mechanism disclosed in the drawing herein for translating the reciprocal motion of the pistons 26 into rotary motion of shaft 30, since I have disclosed in my co-pending application Ser. No. 751,384, filed Nov. 3, 1934, for Double action fluid meter, another mechanism consisting of a wobble plate for accomplishing the translation of the reciprocal movement into rotary movement. In the exemplified form of mechanism disclosed herein, the rotatable shaft 30 mounts fixedly thereon as by pin 36 a ball 37 upon which there is adjustably clamped as by plate 38 a disc cam plate 39 which has a peripheral cam track 40 on each of its opposite faces. Each of the connecting rods 27 of pistons in opposed cylinders carry at their relatively adjacent ends an interconnecting yoke 42 which mounts anti-friction bearings or rollers 43 which ride upon the opposite faces 40 of the cam track, and upon reciprocation of the pistons the cam track is thusly rotated, and thereby the shaft 30 is rotated responsive to the reciprocation of the pistons in the cylinders. The angle of inclination of the cam disc relative to the axis of the rotatable shaft 30 may be adjusted by a set screw 44. The yoke 42 may be provided with a shoe 46 to slidingly engage the outer peripheral face of the cam disc and thereby steady the rotation of the disc relative to the reciprocation of the piston.

The valves 32, 33 illustrated in the preferred form exemplified in the drawing consist of cup-like structures having a greater radial dimension on one side of the axis of rotation than on the opposite side of said axis as at 47, 48, the cups of said two sides being in communication. The valve is also provided with oppositely disposed wings 49 which will be further explained in connection with the operation of the valve.

The mode of operation of the apparatus is as follows:—

An inlet conduit 51 is provided in communication with the central compartment 24 within the casing and preferably into the space between the opposed banks of cylinders. This permits a free inflow into the compartment 24. All incoming fluid through conduit 51 must pass through the cylinder chambers 21 in order to actuate the pistons and thereby be measured on the counter mechanism 28. It will be understood that no two cylinders in the same bank of cylinders are necessarily diametrically opposed, but that the cylinders operate in stepped relationship successively, but of necessity, opposed pistons in the separate banks operate in the same direction relative to each other but are simultaneously functioning for opposite purposes in the opposed cylinders. The valves as they rotate have their cup portions 47, 48 continuously in communication with the passageway 23 and, as the valves rotate the large cup portion 47 successively communicates with the respective openings 25 of the successive cylinder chambers, thus successively providing communication from the inlet conduit to the interior of the cylinders. As the valve rotates, the wing 49 momentarily closes the opening 25 so that the cup portion 47 may not be partially overlying a port 25 for filling the cylinder with fluid while another part of the same port 25 is open to communication with the outlet chamber 16, 17. By this valve and port structure, the incoming fluid may flow from compartment 24 through passageways 23 and openings 22 into the cups 47, 48 of the valve and thence through opening 25 into the respective cylinder chambers and thus depresses the piston 26 in successive cylinders; and simultaneously in the particular opposed cylinder in the opposite bank of cylinders the smaller cup pocket 48 continues in communication with central passageway 23 through openings 22, and the larger pocket 47 has rotated for communication with port 25 of another cylinder, so that when the piston in the first bank makes an intake stroke the piston in the opposed cylinder of the opposite bank makes a discharge stroke, and the fluid is discharged from the cylinder through port 25 into the adjacent respective chamber 16, 17 with which it has communication. For this reason, the valves 32, 33 at the opposite ends of rotatable shaft 30 have their larger pockets 47 disposed on the opposite sides of the axis of the shaft 30 and the smaller pockets 48 are likewise oppositely disposed relative to the axis of said shaft. The fluid discharged from the cylinder ports 25 flows from the separate cylinder banks into the respective chambers 16 and 17 and thence through the openings or ports 19 and through a fluid outlet conduit 53, having, in transit through the cylinders, reciprocated the pistons 26 and thereby rotated the cam disc 39 which in turn has rotated shaft 30 which has registered the fluid volume in transit upon the counting mechanism 28.

While the valve structure exemplified herein is the preferred form, it is to be understood that other valve structures may be adopted in carrying out this invention, one of such alternate forms of valves being disclosed in my co-pending application for Double action fluid meter heretofore mentioned herein.

Having thus described my invention, what I claim and desire to secure by Letters Patent is:—

1. A fluid meter having an inlet conduit and an outlet conduit, a pair of relatively spaced banks of oppositely disposed ported cylinders providing a central chamber in the space therebetween into which one of said conduits has free communication, the cylinders of each bank being opposed to and axially aligned with the cylinders of the other bank, a rotatable valve associated with each bank of cylinders for controlling said cylinder ports and providing communication from the interior of the cylinders alternately to the central chamber and to the other of said conduits, respectively, a piston reciprocably mounted in each cylinder, means including a disc plate operable responsive to the reciprocation of the pistons for correlating the reciprocation of the pistons and translating the reciprocal movement thereof to rotary motion, and means operated by the last mentioned means for rotating each of the valves responsive to reciprocation of the pistons in the cylinders, the said meter having therein a pair of passageways from said central chamber, said respective passageways communicating with the respective cylinders of the respective banks upon rotation of the respective valves.

2. A fluid meter having an inlet conduit and an outlet conduit, a pair of relatively spaced banks of oppositely disposed ported cylinders, providing a central chamber in the space therebetween into which one of said conduits opens, the cylinders of each bank being opposed to and axially aligned with the cylinders of the other bank, a rotatable valve associated with each bank of cylinders for controlling said cylinder ports and for providing communication from the interior of the cylinders alternately to the central chamber and to the other of said conduits, a piston reciprocably mounted in each cylinder, means mounted in said central chamber for correlating the reciprocation of the pistons in the respective banks for translating the reciprocal movement thereof to rotary motion and providing operative connection between pistons in axially aligned opposing cylinders for simultaneous reciprocation of oppositely disposed pistons, and a rotatable shaft operated by the last means for rotating each of the valves responsive to reciprocation of the pistons in the cylinders, the said meter having therein a pair of passageways from said central chamber, communicating with the cylinders of the respective banks upon rotation of the respective valves, and the respective axes of the cylinders and rotatable shaft being substantially parallel.

3. A fluid meter including a casing having an inlet conduit and an outlet conduit, a pair of relatively spaced banks of oppositely disposed ported cylinders providing a central chamber in the space therebetween into which one of said conduits opens, each bank comprising a plurality of cylinders arranged about and spaced from a common axis providing a central passageway for fluid from the central chamber to each bank of cylinders, a rotatable shaft member mounted in said passageways and extending through the central chamber, the respective axes of the shaft and cylinders being substantially parallel, a valve mounted for rotation on each end portion of said shaft member adjacent each bank of cylinders for controlling the ports of the adjacent cylinders, said valves upon rotation thereof providing communication from the interior of the cylinders alternately to the central chamber and to the other of said conduits, a piston reciprocably mounted in each cylinder, and means for correlating the reciprocation of the pistons for translating the reciprocal movement thereof to rotary motion for rotating said shaft member responsive to reciprocation of the pistons in the cylinders, said last mentioned means having operative connection between pistons in relatively opposite cylinders in the respective banks whereby pistons in opposite cylinders reciprocate simultaneously.

4. A fluid meter including a casing having an inlet conduit and an outlet conduit, a pair of relatively spaced banks of ported cylinders providing a central chamber in the space therebetween into which one of said conduits opens, each bank comprising a plurality of cylinders circularly arranged about and spaced from a common axis providing a central passageway for fluid from the central chamber to each bank of cylinders, the cylinders of each bank being opposed to and axially aligned with the cylinders of the other bank, a piston reciprocably mounted in each cylinder, the pistons in opposing cylinders having a connecting member therebetween adapting them for simultaneous reciprocation, a rotatable shaft member extending through the central chamber and said passageways and rotatable responsive to reciprocation of the pistons, a valve mounted to rotate with said rotatable member adjacent each bank of cylinders, said valves controlling the ports of the cylinders and providing, upon rotation thereof, communication alternately between the interior of the cylinders in the corresponding adjacent bank and the respective inlet and outlet conduits, and disc plate means mounted on said rotatable shaft in said central chamber and having its radially outward portion operatively connected to pistons of opposing banks for correlating the reciprocation of the pistons in the respective banks and translating the reciprocal movement thereof to rotary motion.

5. A fluid meter including a casing having therein a pair of relatively spaced banks of ported cylinders providing therebetween a central chamber, said banks of cylinders at their opposite ends being spaced from the casing providing outer chambers, the cylinders of each bank being relatively oppositely disposed to the cylinders of the other bank, a piston reciprocably mounted in each cylinder, a rotatably mounted valve in the outer chamber of each bank of cylinders for controlling the ports of the adjacent cylinders and providing, upon rotation thereof, communication alternately between the interior of the cylinders and the respective central and outer chambers, and means in said central chamber operative responsive to reciprocation of the pistons in the cylinders for translating the reciprocal movement of the pistons to rotary motion, said last mentioned means being operatively connected to the valves for rotating the valves.

6. A fluid meter having an inlet conduit and an outlet conduit, a pair of relatively spaced banks of oppositely disposed ported cylinders providing a central chamber in the space therebetween having free communication with one of said conduits, a rotatable valve associated with each bank of cylinders for controlling said cylinder ports and providing communication from the interior of the cylinders alternately to the central chamber and to the other of said conduits, respectively, said valves having their respective axes of rotation parallel to the axes of the cylinders, a piston reciprocably mounted in each cylinder, means operable responsive to reciprocation of the pistons for correlating the reciprocal movement thereof and translating such movement to rotary motion, and means operated by the last mentioned means for actuating said valves responsive to reciprocation of the pistons in the cylinders, the said meter having therein a pair of passageways from said central chamber, said respective passageways communicating with the cylinders of the respective banks upon actuation of the valves.

7. A fluid meter including an inlet conduit and an outlet conduit, a pair of relatively spaced banks of ported cylinders having therebetween a central chamber, one of said conduits communicating with the central chamber and the other of said conduits communicating with the cylinders of each bank through the cylinder ports, a piston reciprocably mounted in each cylinder, rotatably mounted valve means for controlling the ports of the cylinders in the respective banks and providing, upon rotation thereof, communication from the interior of the cylinders alternately to the central chamber and to the said other conduit which communicates with the cylinders, and means in said central chamber operative responsive to reciprocation of the pistons in the cylinders for translating the reciprocal movement of the pistons to a rotary motion on a rotative axis which is parallel to the axes of the cylinders, said last mentioned means being operatively connected to the valve means for rotating said valve means, the cylinders in each bank being disposed about a common axis and spaced therefrom providing centrally of each bank of cylinders a passageway which communicates with the interior of the adjacent cylinders through the valve means.

8. A fluid meter including a casing provided with an inlet opening and an outlet opening and having therein a pair of relatively oppositely spaced banks of ported cylinders providing therebetween a central chamber which communicates with one of said openings, said casing having therein a conduit communicating with the other of said openings and with the cylinders of the respective banks of cylinders, the cylinders of each bank being arranged about and spaced from a common axis providing a passageway centrally of each bank of cylinders, a piston reciprocably mounted in each cylinder, a shaft rotatably mounted in said passageways on a rotative axis parallel to the axes of the cylinders, valve means mounted on said rotatable shaft at said central passageway for controlling the ports of the cylinders in the respective banks of cylinders and providing communication from the interior of the cylinders alternately to the respective central chamber and said other conduit which communicates with an opening in the casing, and means in said central chamber operative responsive to reciprocation of the pistons in the cylinders for translating the reciprocal movement of the pistons to rotary motion having a rotative axis parallel to the axes of the cylinders, said last mentioned means being operatively connected to said shaft for actuating the valve means and having operative connection with pistons in the respective opposite banks of cylinders whereby pistons in relatively opposite cylinders are simultaneously reciprocated.

9. In a fluid meter having an inlet conduit and an outlet conduit, a pair of relatively spaced banks of cylinders having a central chamber therebetween, the cylinders of each bank being arranged about and spaced from a common axis providing a passageway centrally between the cylinders in each bank, a reciprocable piston in each cylinder, said cylinders each having an end closure and being provided with a port, a rotatably mounted shaft, valve means mounted at said respective central passageways and operably connected to said shaft and adapted for controlling the opening and closing of the ports of the cylinders and providing communication from the inlet conduit to the outlet conduit through the valve means, the central chamber, the said respective passageways and cylinders, said valve means and shaft having their respective axes in a direction parallel to the axes of the cylinders, and means including a disc plate in said central chamber for correlating the reciprocation of the pistons in the cylinders and translating the reciprocal movement of the pistons to rotary movement, the rotative axis of which is parallel to the axes of the cylinders, said last mentioned means being connected to said shaft for rotating said shaft and thereby actuating the valve means.

HOSMER L. BLUM.